(12) United States Patent
Krause

(10) Patent No.: US 9,732,792 B2
(45) Date of Patent: Aug. 15, 2017

(54) COMPONENT OF A ROLLING-ELEMENT BEARING AND METHOD FOR MANUFACTURING A COMPONENT OF A ROLLING-ELEMENT BEARING

(71) Applicant: Thomas Krause, Grafenrheinfeld (DE)

(72) Inventor: Thomas Krause, Grafenrheinfeld (DE)

(73) Assignee: AKTIEBOLAGET SKF, Gothenborg (SE)

( * ) Notice: Subject to any disclaimer, the term of this patent is extended or adjusted under 35 U.S.C. 154(b) by 64 days.

(21) Appl. No.: 14/750,007

(22) Filed: Jun. 25, 2015

(65) Prior Publication Data
US 2015/0377296 A1    Dec. 31, 2015

(30) Foreign Application Priority Data
Jun. 26, 2014  (DE) .......................... 10 2014 212 315

(51) Int. Cl.
| | | |
|---|---|---|
| *F16C 33/66* | (2006.01) | |
| *F16C 19/22* | (2006.01) | |
| *F16C 33/34* | (2006.01) | |
| *F16C 33/58* | (2006.01) | |
| *F16C 33/62* | (2006.01) | |
| *F16C 33/64* | (2006.01) | |
| *F16C 19/26* | (2006.01) | |

(52) U.S. Cl.
CPC ............ *F16C 19/225* (2013.01); *F16C 33/34* (2013.01); *F16C 33/585* (2013.01); *F16C 33/62* (2013.01); *F16C 19/26* (2013.01); *F16C 33/64* (2013.01); *F16C 2208/82* (2013.01); *F16C 2223/32* (2013.01); *F16C 2240/60* (2013.01)

(58) Field of Classification Search
CPC .... F16C 33/585; F16C 33/586; F16C 19/225; F16C 33/20; F16C 33/201; F16C 33/62; F16C 33/64; F16C 2208/02; F16C 2208/04; F16C 2208/82; F16C 2223/32
See application file for complete search history.

(56) References Cited

U.S. PATENT DOCUMENTS

| | | | |
|---|---|---|---|
| 3,623,981 A | | 11/1971 | Giltrow et al. |
| 3,675,978 A | | 7/1972 | McKelvey |
| 5,669,719 A | * | 9/1997 | Kinno ..................... F16C 19/26 |
| | | | 384/463 |
| 2009/0067985 A1 | | 3/2009 | Dobek, Jr. et al. |
| 2013/0343689 A1 | | 12/2013 | Kobayashi et al. |

FOREIGN PATENT DOCUMENTS

| | | |
|---|---|---|
| DE | 3218145 A1 | 11/1983 |
| DE | 102007036660 A1 | 2/2009 |
| DE | 102009036688 A1 | 2/2011 |
| DE | 102010030648 A1 | 12/2011 |
| DE | 102012217505 A1 | 12/2012 |
| DE | 102012217506 A1 | 3/2014 |
| JP | 200895916 A | 10/2012 |
| WO | 2011138309 A1 | 11/2011 |

* cited by examiner

*Primary Examiner* — Phillip A Johnson
(74) *Attorney, Agent, or Firm* — Bryan Peckjian; SKF USA Inc. Patent Dept.

(57) ABSTRACT

A component of a rolling-element bearing, such as a bearing inner ring having an inner ring flange, a bearing outer ring having an outer ring flange or a rolling element having an end surface, includes a solid slide layer having a lower coefficient of friction than a material to which the slide layer is attached which slide layer reduces frictional contact between the component and another component against which the slide layer slides during bearing operation.

16 Claims, 2 Drawing Sheets

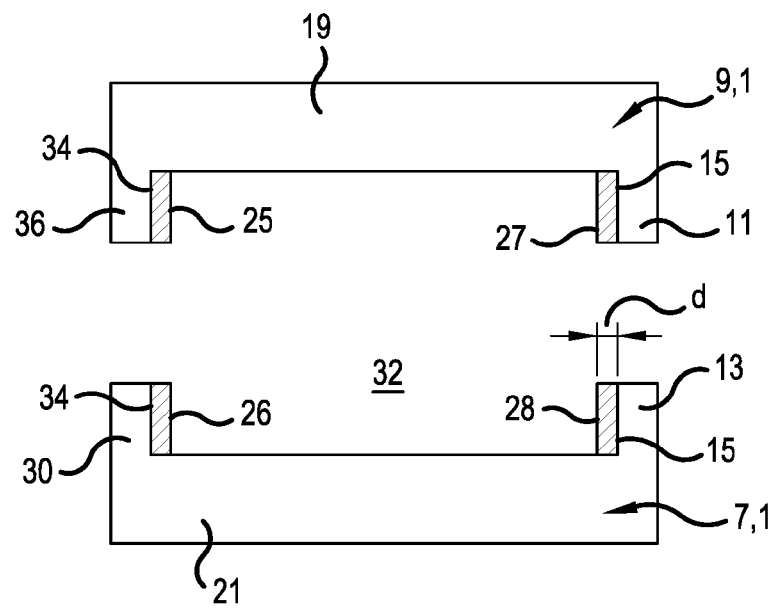
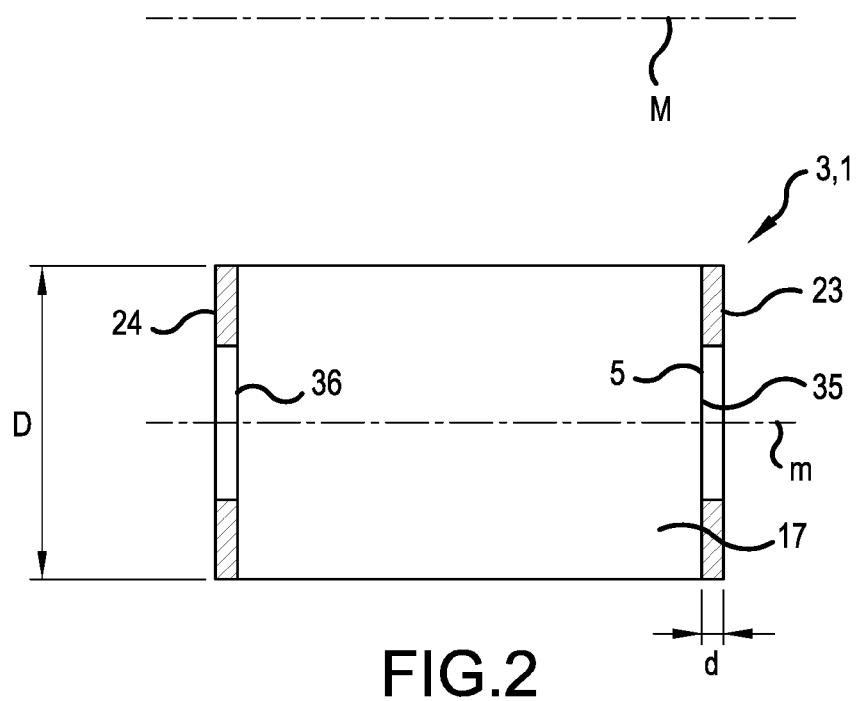
FIG.2

COMPONENT OF A ROLLING-ELEMENT BEARING AND METHOD FOR MANUFACTURING A COMPONENT OF A ROLLING-ELEMENT BEARING

CROSS-REFERENCE

This application claims priority to German patent application no. 10 2014 212 315.1 filed on Jun. 26, 2014, the contents of which are fully incorporated herein by reference.

TECHNOLOGICAL FIELD

Exemplary embodiments relate to a component of a rolling-element bearing and to a method for manufacturing a component of a rolling-element bearing.

BACKGROUND

In rolling-element bearings (e.g., cylindrical roller bearings (CRB) or tapered roller bearings (TRB)), axial and similar stresses can press the rolling elements against an inner side of a guide flange and create a high axial contact pressure between the inner side of the guide flange and the end of the rolling element. Furthermore, a sliding-friction contact or a sliding friction can occur between the rolling elements and the flange. A sliding-friction contact between two components, for example, steel components, can cause them to wear prematurely and/or produce an undesirably high level of friction between the components.

Increased friction in this region can also lead to higher energy consumption and/or can negatively impact the operation of the rolling-element bearing. For example, the increased friction could lead to an increase in the bearing temperature and an associated greater stress on any lubricant used. Furthermore, metallic wear particles may be generated by the end-side wear of the rolling elements and/or wear of the flange. Under certain circumstances these particles can be pressed into the raceway and damage the raceway and/or the rolling elements. As a result, increased friction and/or increased wear may shorten the service life of the bearing.

There is therefore a need to improve a rolling-element bearing such that it can better support an axial load.

SUMMARY

This need is met by a component of a rolling-element bearing and a method for manufacturing the component of a rolling-element bearing according to the present disclosure.

Exemplary embodiments relate to a component of a rolling-element bearing that includes an inner ring, an outer ring and at least one rolling element. The rolling element includes at least one end surface (e.g., an end side), and at least one of the rings includes a guide flange (e.g., flange). A sliding friction can occur, for example, in the case of an axial load, between a lateral surface of the guide flange, which lateral surface is facing towards the rolling element, and the end surface of the rolling element. The component further comprises a base body made from a material and a slide layer. The slide layer is attached between the end surface and the lateral surface to either one or both of the rings or to the rolling element or to one or both of the rings and to the rolling element. The slide layer also comprises a material. The material of the slide layer has a lower friction value, e.g., a lower coefficient of friction, than the material of the base body of the device.

The presence of the slide layer attached between the end surface of the rolling element and the lateral surface of the guide flange may increase the service life of the rolling-element bearing. Furthermore, the slide layer may reduce wear of the bearing, and/or wear of the rolling element and/or wear of the guide flange. In this way the risk of the guide flange fracturing (flange fracture) due to wear is minimized. Furthermore, the slide surface may reduce friction when an axial load is applied to the bearing and thus also reduce bearing temperature. The slide layer may also damp or absorb axial shocks or shock loads under certain conditions.

The slide layer can be attached in any manner to the component or the base body of the component. For example, the slide layer can be attached to the component using various processes, including without limitation by adhesion, by application as a liquid that is allowed to dry and harden, by an injection molding process, by an assembly injection molding process, by an overmolding process, or by a vapor deposition process. For example, the slide layer can include an adhesive surface or adhesive layer that allows it to be attached to the bearing component. The slide layer can be configured such that if the rolling element and the lateral surface of the guide flange meet, they are not displaced, but rather can fulfill their functions. In addition, the slide layer can be configured from a material that remains solid at a bearing operating temperatures.

A friction value of a material can be, for example, a coefficient of friction, also called the friction number. The friction value can be a dimensionless value that indicates a measure of a frictional force in relationship to a pressing force between two bodies.

In some further exemplary embodiments the component is the rolling element, and the rolling element includes the slide layer or the slide layer is attached to the rolling element. Since the slide layer has a lower friction value than the rolling element, which could be formed from steel, sliding friction between the rolling element and a flange can be reduced as compared to the sliding friction that would occur between two contacting steel surfaces. The end surface of the rolling element can face in an axial direction or be inclined at an angle with respect to an axis of rotation of the rolling-element bearing. Furthermore, the rolling element can be a roller, a cone, a barrel, or a pin, etc. In other words, some exemplary embodiments relate to a rolling element including a slide layer. The slide layer is attached to the end surface of the rolling element. The slide layer comprises a material, and the material of the slide layer has a lower friction value than the rest of the material of the rolling element.

In some further exemplary embodiments the component is the inner ring and/or the outer ring of the rolling element bearing. Thus if the rolling element, which may be formed from steel, meets the slide layer of the guide flange, only a slight friction arises between these two components. Furthermore, wear can potentially be reduced as compared to wear that can occur between the two components without the slide layer. The component can be the inner flange. In other words, some exemplary embodiments relate to an inner ring and/or an outer ring and/or a guide flange including a slide layer. The slide layer is attached to an inner lateral surface of the inner ring, of the outer ring, and/or of the guide flange, which faces an interior of the bearing. The slide layer comprises a material that has a lower friction value than another material of the inner ring, and/or the outer ring, and/or of the guide flange, a lower friction value than that of steel, for example.

The slide layer or a plurality of slide layers can be attached to the flange inner side or to the rolling-element inner side by adhesion. This could be sufficient for some applications since the slide layer could possibly only be stressed by pressure loading and shear forces and not be subject to a tensile stress that would overcome the adhesive forces and separate the slide layer from the component. A further attachment possibility could be, for example, assembly injection molding or overmolding. For this purpose, in order to possibly produce a necessary interference fit, at least one undercut could be provided in the device or the rolling element or the guide flange of the ring so that the material of the slide surface would fill the undercut and better secure the slide surface body to the rolling element bearing component.

In some further exemplary embodiments the slide surface can be provided on the rolling element and the guide flange, or on the inner ring and/or on the outer ring. A slide layer may thus be attached to both the end side of the rolling element and to the lateral surface of one or both guide flanges that faces the rolling element. Sliding friction that could arise from contact between two components could thereby be reduced even further. In other words, some exemplary embodiments relate to a rolling-element bearing that includes a rolling element, an inner ring, and an outer ring any or all of which include the slide layer.

In some further exemplary embodiments the slide layer includes at least one fiber which could potentially improve a compressive strength of the slide layer. The fiber can be a plastic, glass, or carbon fiber, for example, and the fiber can be systematically aligned. The fiber can have a length of at least 0.1 mm, 0.2 mm, 0.4 mm, 0.5 mm, 1.0 mm, or 1.1 mm, and the slide layer can comprise a plurality of fibers. The fibers can be disposed unidirectionally or parallel to one another, and, additionally or alternatively, at least one fiber can be disposed orthogonal to another fiber. The fibers can be disposed in the form of a fabric layer, and the fibers can be polytetrafluoroethylene (PTFE) fibers.

In some further exemplary embodiments the slide layer comprises a plastic. An improved tribological property of the slide layer could thereby be effected. The slide layer could optionally thereby have a lower friction value. Examples of the plastic can be a thermoplastic (thermoplastic plastic) or a duroplastic or thermoset plastic (e.g., phenol resin, epoxy resin). In other words, by using at least one slide layer made from a plastic, the direct, tribologically unfavorable steel-on-steel (steel-steel) sliding contact between the rolling element and the guide flange can be at least reduced or even prevented. In a sliding contact with an opposite side or a body made from a steel, the tribologically optimized slide layer, for example, made from plastic, could ensure that a lower friction, and thus possibly less wear, occurs. For example, wear could thereby be reduced, or only a wear of the slide layer could occur. Furthermore wear particles of the slide layer, plastic for example, would be significantly softer than metal wear particles. As a result these wear particles are less likely to be pressed into the running surfaces and damage the rolling elements and/or raceways. The plastic slide layer or the plastic itself should support a static pressure load of up to 120 MPa or even 300 MPa.

In some further exemplary embodiments the slide layer is configured as a circular disc or an annular disc that would uniformly cover a surface of a flange or an end surface of a rolling element. Using an annular-disc-shaped slide layer on the end surface of a rolling element helps ensure that that end surface of the rolling element is provided to a sufficient extent with the slide layer. Alternatively or additionally the slide layer can be configured in any shape, for example as a rectangle, grid-type, strip-type, etc. For example, the slide layer could be only sectionally attached to the device.

In some further exemplary embodiments the slide layer has a thickness of 0.1 mm to 0.5 mm. For example, the slide layer can have a thickness that falls within a range of values having an ending value and a starting value. For example, the starting value can be 0.1 mm, 0.2 mm, 0.3 mm, or 0.4 mm, and the ending value can be 1.0 mm, 0.8 mm, 0.5 mm, 0.4 mm, 0.3 mm, or 0.2 mm. The thickness of the slide layer may refer to an extension of the slide layer in an axial direction in an installation situation or to a direction in which the slide layer extends away from the device. Since the slide layer is thin relative to the dimensions of the rolling element and flanges, the slide layer will not significantly affect the geometry of the rolling-element bearing.

In other words, exemplary embodiments can relate to tribologically optimized thin-walled slide layers, for example, made from a plastic. These can be attached to the inner side of rolling-element bearing flanges (guide flanges, flanges) and/or to the end sides (end surfaces) of rolling elements. The friction and the wear of the rolling-element bearing flanges or the roller end sides (end surfaces) in the case of an axial load on the rolling-element bearing can thereby be reduced.

In some further exemplary embodiments the slide layer comprises a filler material that may be configured to improve the sliding properties of the slide layer. It could thereby be achieved, for example, that the sliding properties of the slide layer are improved. For example, the filler material can be any material that is configured to improve a sliding property of a material, including, without limitation: polytetrafluoroethylene (PTFE), graphite, Teflon, and/or MoS2. For example, the filler can be admixed, as a powder, or granules, or in the form of nanoparticles, with the plastic of the slide layer.

In other words, thin-walled (0.1 to 1.0 mm), annular, tribologically optimized slide layers made from a plastic can be attached to the inner side of the guide flange (flange) and/or to the end surface (end side) of the rolling element. The slide layers may be a thermoplastic plastic that can be reinforced with fibers (glass or carbon fibers) to increase its compressive strength. To further optimize the tribological properties, further filler materials, such as, e.g., PTFE, graphite, or MoS2, can be added to the thermoplastic plastic. In other words, the slide layer can comprise a fiber-reinforced plastic or a fiber-reinforced material.

In some further exemplary embodiments the slide layer comprises a pre-impregnated fiber body or "prepreg." These pre-impregnated fiber bodies can be a semi-finished product comprised of at least one continuous fiber and an uncured plastic matrix of duroplastic or thermoplastic. The continuous fibers can be disposed as a unidirectional layer, as a fabric, or as a scrim. This may make it possible to attach the slide layer to a bearing component in a simple manner. In other words, a resin-impregnated fabric layer (liner) can be used as a tribological slide layer. The fabric layer can comprise, for example, a mixed fabric, made of PTFE fibers and, optionally, reinforcing fibers made from a plastic. The mixed fabric can be impregnated with a duroplastic resin (e.g. phenol region or epoxy resin) or with a thermoplastic. This mixed fabric can be applied as an adhesive-capable prepreg or as adhesive-capable pre-impregnated fiber bodies on the metallic base body of the component, for example, the rolling-element end side or the flange inner side. The pre-impregnated fibers can be cured by a temperature treatment, e.g., heating, and thereby adhered or attached to the base body. In other words, a pre-impregnated fiber or fiber layer can be adhered or attached to an end surface of the rolling element and/or to a lateral wall of the guide flange, which lateral wall faces the rolling element.

Exemplary embodiments also relate to a method for manufacturing a component of a rolling-element bearing according to at least one of the preceding exemplary embodiments. In the method a base body of the component is provided, and a slide layer is attached to the component or to the base body of the component. Here the base body of the component can be the rolling element or the guide flange, or the inner ring and/or outer ring of the rolling-element bearing. These elements can be manufactured, for example, from a metallic material, for example, steel.

The slide layer can be attached by adhesion to the component. Further possibilities for applying or attaching the slide layer to the component include brushing or spraying it on as a liquid and allowing it to dry and harden. Furthermore, the slide layer could be attached to the device or applied to the device, for example, by an assembly injection-molding process or using assembly injection molding or by overmolding.

In some further exemplary embodiments the slide layer is heated before being attached to the component which may allow for a simple installation of the slide layer. The slide layer can optionally comprise a fiber. The fiber can be pre-impregnated with a resin. When heated this resin could soften or partially liquefy to produce an adhesion effect. The slide layer could thereby be attached to the base body of the device. Furthermore, the slide layer can optionally comprise a semi-finished product that includes at least one continuous fiber and one uncured duroplastic plastic matrix which could then be cured when attaching or heating on the device. In other words, the slide layer can be a pre-impregnated fiber body (prepreg that is attached to the device by heating and thereby cured.

Further advantageous embodiments are described in more detail below with reference to exemplary embodiments depicted in the drawings, but are not limited to said exemplary embodiments.

BRIEF DESCRIPTION OF THE DRAWINGS

The Figures thus schematically show the following views.

FIG. 1 is a schematic cross-sectional view of an outer ring and an inner ring as components of a rolling-element bearing according to an exemplary embodiment.

FIG. 2 is a schematic cross-sectional view of a rolling element as a component of a rolling-element bearing according to an exemplary embodiment.

DETAILED DESCRIPTION

Figure 3:
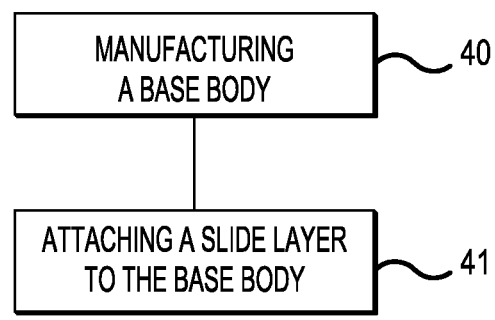
FIG. 3 is a flow chart illustrating a method for manufacturing a component of a rolling-element bearing according to an exemplary embodiment.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features.

Components or objects that are described with the same or summarizing reference numerals can be embodied identically, but also optionally differently, in terms of individual, multiple, or all features, their dimensions, for example, as long as the description does not explicitly or implicitly indicate otherwise.

FIG. 1 shows a device or a component 1 for a rolling-element bearing. The rolling-element bearing comprises at least one rolling element such as the rolling element 3 depicted in FIG. 2. The rolling element 3 includes an end surface 5. The rolling-element bearing also comprises an inner ring 7 and an outer ring 9. At least one of the inner and outer rings 7, 9 includes a guide flange 11 and 13. Sliding friction can occur between a lateral surface 15 of the guide flange 11 or 13 that faces the rolling element 3 and the end surface 5 of the rolling element 3. The component 1 includes a base body 17 or 19 or 21 that comprises a material. The component further comprises a slide layer 23 formed from a material that has a lower friction value, e.g., lower coefficient of friction, than that of the material of the base body 17, 19, or 21 of the component 1.

The component of the rolling element bearing may be the inner ring 7. The inner ring 7 includes a guide flange 13 and a further guide flange 30. A rolling element, for example, the rolling element 3 depicted in FIG. 2, can be received in a region 32 between the inner ring 7 and the outer ring 9. A rolling element without a slide layer can also optionally be received in the region. The inner ring 7 includes the slide layer 28 on its guide flange 13 or a lateral surface 15, which faces the region 32. The slide layer 28 is attached to the guide flange 15, for example by adhesion. In an analogous manner the guide flange 30 may also include the slide layer 26 on a lateral surface 34 that faces the region 32.

In a further exemplary embodiment the component 1 can be the outer ring 9 depicted in FIG. 1. The outer ring 9 includes a slide layer 27 on its guide flange 11 or on the side surface 15 facing the region 32. Furthermore, the outer ring 9 can also include a slide layer 25 on a further guide flange 36 or on a lateral surface 34 that faces the region 32.

In FIG. 1 only the parts of the inner ring 7 and the outer ring 9 that lie on one side of a central axis M of the rolling-element bearing are depicted. The slide layers 25, 26, 27, and 28 can be annular or disposed only sectionally along the lateral surfaces 15 and 34. The slide layer 28 can have a thickness d where this thickness d is the extension of the slide layer in a direction that extends away from the lateral surface 15 of the guide flange 13. In an analogous manner the slide layers 25, 26, and 27 can also have a thickness. The thickness can be between 0.1 mm and 1.0 mm.

In some exemplary embodiments the component can also comprise both the inner ring 7 and the outer ring 9.

FIG. 2 is a schematic cross-sectional depiction of a rolling element as a component of a rolling-element bearing according to an exemplary embodiment.

Furthermore, the component 1 can also be configured as the rolling element 3, as shown in FIG. 2. For this purpose the slide layer 23 can be attached to an end surface 5 of a base body 17 of the rolling element 3. The rolling element 3 further includes a slide layer 24 disposed on an end surface 34 that opposes the end surface 5.

In further, not-depicted exemplary embodiments the rolling element can include a slide layer on only one end surface or side.

In the exemplary embodiment of FIG. 2 the end surface of the rolling element 3 faces in an axial direction. The slide layer 23 can have a thickness d. Here the thickness d is an extension of the slide layer 23 that extends in a direction away from the base body 17 of the device or of the rolling element 3. The thickness d can be between 0.1 mm and 1.0 mm, for example, 0.5 mm. The slide layer 23 is shaped as an annular disc, and the slide layer 23 includes an opening 35. The opening 35 is disposed concentric to an axis of rotation m of the rolling element 3. For example, an outer diameter D of the slide layer 23 can correspond to a diameter of the rolling element 3.

In some further, not-depicted exemplary embodiments the slide layers 23 or 24 can have a smaller diameter than the diameter of the rolling element 3. Additionally or alternatively the slide layer can be configured without the opening 35, for example, in the shape of a circular disc. In some further, not-depicted exemplary embodiments the slide layers 25 to 28 can have a smaller diameter than the lateral surface 15 or 34. In other words, the slide layers 25 to 28 could be disposed only sectionally on the lateral surfaces 15 or 34 in the circumferential direction and/or in the radial direction.

A rolling-element bearing according to an exemplary embodiment can include the inner ring 7 and the outer ring 9. For example, the inner ring 7 and a plurality of rolling elements 3 could be configured without a slide layer. Furthermore, the rolling-element bearing could include an inner ring 7 with a slide layer and an outer ring 9 without a slide layer and rolling elements 3 without a slide layer. In further exemplary embodiments the rolling-element bearing could include an outer ring 9 with the slide layer and an inner ring 7 with the slide layer. A plurality of rolling elements 3 with or without slide layers could be received in the region 32. In further exemplary embodiments a rolling-element bearing could include an outer ring 9 and an inner ring 7 both having a slide layer. A plurality of rolling elements 3 with or without the slide layer could be received in the region 32.

In other words, to minimize the end-side rolling-element wear and the flange wear, for example due to axial loads, the rolling-element bearing could include a slide layer made from a plastic on the bearing flange and/or on the end side of the rolling element.

FIG. 3 schematically shows a method for manufacturing a component of a rolling-element bearing according to one of the exemplary embodiments.

In the method a base body is manufactured or provided at a step 40. Furthermore, a slide layer is attached to the base body at a step 41. An inner ring having a guide flange, an outer ring having a guide flange, or a rolling element can be manufactured or provided, for example, as a base body of the device, and these components can be manufactured from a metallic material such as steel, aluminum, brass, etc. A slide layer can be attached to the base body, for example, by adhering, painting or brushing, or in an assembly injection-molding method. Furthermore, the slide layer can be attached to the base body of the device by heating, for example, if the slide layer is configured as a pre-impregnated fiber body.

A device according to the exemplary embodiment could be used in any type of rolling-element bearing including, without limitation, a flange, a cylindrical roller bearing, a tapered roller bearing (e.g., CRB or TRB), or in a rolling-element bearing for railway vehicles (railway).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved components of rolling element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Component
3 Rolling element
5 End surface
7 Inner ring
9 Outer ring
11 Guide flange
13 Guide flange
15 Lateral surface
17 Base body
19 Base body
21 Base body
23 Slide layer
24 Slide layer
25 Slide layer
26 Slide layer
27 Slide layer
28 Slide layer
30 Guide flange
32 Region
34 Lateral surface
35 Opening
36 End surface
40 Manufacturing
41 Attaching
M Central axis
d Thickness
D Diameter
m Rolling-element axis of rotation

What is claimed is:

1. A component of a rolling-element bearing selected from a group consisting of a bearing inner ring having an inner ring flange, a bearing outer ring having an outer ring flange and a rolling element having an end surface, the component including a solid slide layer having a lower coefficient of friction than a material from which the component is formed,
wherein the slide layer comprises a pre-impregnated fiber body.

2. The component according to claim 1, wherein the pre-impregnated fiber body comprises a prepreg attached to the component by heating and curing.

3. The component according to claim 2, wherein the component is the rolling element.

4. The component according to claim 2, wherein the component is the inner ring.

5. The component according to claim 2, wherein the component is the outer ring.

6. The component according to claim 2, wherein the component is one or more of the inner ring, the outer ring and the rolling element.

7. The component according to claim 2, wherein the slide layer comprises a plastic.

8. The component according to claim 2, wherein the pre-impregnated fiber body is a circular disc or an annular disc.

9. The component according to claim 2, wherein the slide layer has a thickness of 0.1 mm to 1.0 mm.

10. The component according to claim 2, wherein the slide layer comprises a filler material for changing sliding properties of the slide layer.

11. The component according to claim 2,
wherein the component is one or more of the inner ring, the outer ring and the rolling element,
wherein the slide layer comprises at least one fiber,
wherein the slide layer comprises a plastic,
wherein the slide layer is a circular disc or an annular disc,
wherein the slide layer has a thickness of 0.1 mm to 1.0 mm, and
wherein the slide layer comprises a filler material for changing sliding properties of the slide layer.

12. A method comprising:
providing a component of a rolling-element bearing selected from a group consisting of a bearing inner ring having an inner ring flange, a bearing outer ring having an outer ring flange and a rolling element having an end surface, and
providing a prepreg ring comprising at least one continuous fiber and uncured duroplastic material;
moving the prepreg ring toward and into contact with the inner ring flange or the outer ring flange or the end surface;
heating the prepreg to soften or partially liquefy the duroplastic material,
adhering the prepreg having the softened or partially liquefied duroplastic material to the inner ring flange or against the outer ring flange or against the end surface, and
curing the duroplastic material, wherein the prepreg having the cured duroplastic material has a lower coefficient of friction than a coefficient of friction of the component.

13. The method according to claim 12, wherein the component is one or more of the inner ring, the outer ring and the rolling element.

14. The method according to claim 12, wherein the prepreg is a circular disc or an annular disc.

15. The method according to claim 12, wherein the prepreg has a thickness of 0.1mm to 1.0 mm.

16. The method according to claim 12, wherein the prepreg includes a filler material for changing sliding properties of the prepreg after curing.

* * * * *